W. B. DAVIES.
Improvement in Apparatus for Spreading Plastic-Compounds in the Manufacture of Roofing-Fabrics, &c.
No. 128,367. Patented June 25, 1872.

Witnesses:
Ernst Bilhuber
C. Wahlers

Inventor:
William B. Davies

UNITED STATES PATENT OFFICE.

WILLIAM B. DAVIES, OF BROOKLYN, NEW YORK.

IMPROVEMENT IN APPARATUS FOR SPREADING PLASTIC COMPOUNDS IN THE MANUFACTURE OF ROOFING-FABRICS, &c.

Specification forming part of Letters Patent No. 128,367, dated June 25, 1872.

*To all whom it may concern:*

Be it known that I, WILLIAM B. DAVIES, of Brooklyn, in the county of Kings and State of New York, have invented a new and Improved Apparatus for Spreading Plastic and other Compounds; and I do hereby declare the following to be a full, clear, and exact description thereof, which will enable those skilled in the art to make and use the same, reference being had to the accompanying drawing forming part of this specification, in which drawing—

Figure 1:
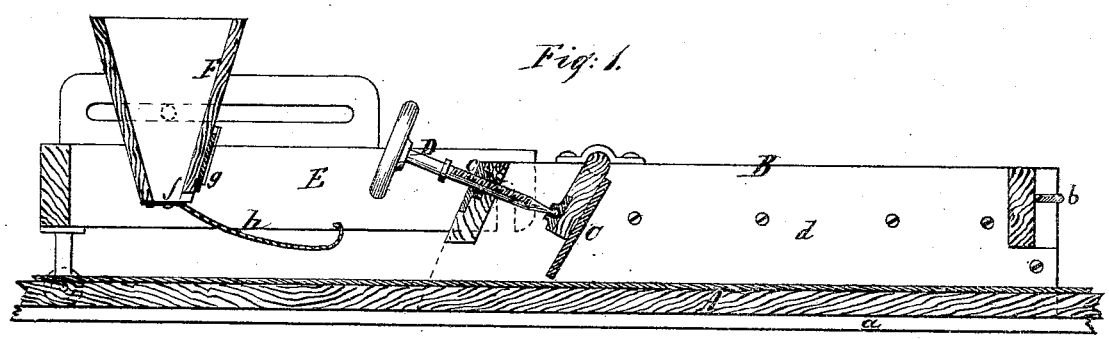
Figure 2:
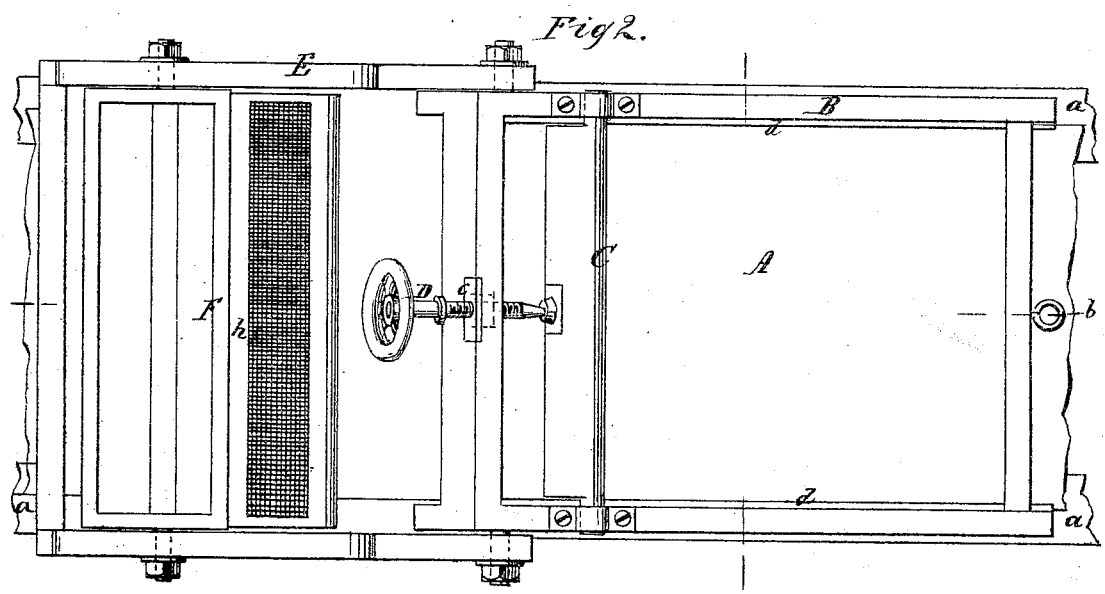
Figure 3:
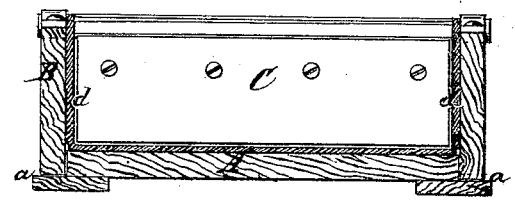

Figure 1 represents a longitudinal vertical section of my apparatus. Fig. 2 is a plan or top view of the same. Fig. 3 is a transverse section of the same.

Similar letters indicate corresponding parts.

This invention consists in a trough, open at top and bottom, which slides in guide-ways formed on a table or platform, said trough being provided with a movable scraper or spreader in such a manner that, when the paper or other material is spread on the platform and the trough is filled with a plastic or other semi-fluid compound and then drawn over the platform, said compound is evenly spread over the entire surface of the paper or other material, the thickness of the layer formed thereon being determined by the scraper, which can be readily adjusted to suit the purpose to be effected. The working part of the scraper consists of a strip of thick India-rubber cloth, which has the property to yield to a certain extent, and which does not adhere to the compound to be spread. The sides of the trough are lined with strips of India-rubber cloth, the edges of which bear down upon the platform or table, or on the material spread thereon, and prevent leakage of the compound. With the sliding trough and platform is combined a hopper that moves with the trough and in the rear thereof, and is provided with a sprinkler in such a manner that, if the hopper is filled with sand and caused to move over the platform, sand which discharges from the said hopper is evenly spread over the layer of compound formed by the action of the trough.

In the drawing, the letter A designates a platform or table, the length of which is sixty feet, (more or less,) and on which is spread a sheet of paper, felt, cloth, or other material that is to receive a coat of a plastic or semi-liquid compound. On the edges of this platform or table are formed guide-ways $a\ a$, to receive a trough, B, which is open at top and bottom, and which is provided with a loop or staple, $b$, for the purpose of securing thereto a rope that serves to draw said trough over the platform. In the trough is secured a scraper, C, which is hung on gudgeons in such a manner that its working edge can be adjusted at any desired elevation above the surface of the platform A. In the example shown in the drawing the scraper is hung on gudgeons, and it is connected to a screw, D, which is fitted in a nut, $c$, secured to the end cross-bar of the trough, and which connects by a swivel-joint with the scraper, so that by turning the screw the working edge of said scraper can be adjusted at the required elevation above the surface of the platform. The working part of my scraper consists of a strip of India-rubber cloth, which is secured to a head, of wood or other similar material, and the edge of which is rendered yielding to a certain degree, so that it is enabled to spread the compound evenly upon the surface of the paper or other material spread on the table A. On the inner surface of the sides of the trough are secured strips $d$ of India-rubber cloth, the edges of which bear down upon the platform A or upon the paper or other material spread thereon, so as to prevent leakage of the compound at the sides of the trough.

I use India-rubber cloth for the packing and for the scraper, since the compounds which I intend to spread by the aid of my apparatus are of such a nature that they do not adhere to India rubber.

From the rear end of the trough B extends a frame, E, which supports a hopper, F, and which is secured to the trough by hooks or other suitable fastenings. The rear end of the frame E rests upon wheels, which, when the trough is moved over the platform A, travel on the guide-ways $a\ a$, and the hopper F is secured to said frame so that it can be moved closer to or further from the end of the trough, as may be desirable. The inner side of the hopper is provided with a discharge-opening, $f$, which can be closed by a gate, $g$; and under this discharge-opening is secured an apron, $h$, which is partly perforated or made of wire-netting, so that, if the hopper is filled with sand and drawn over the platform A in the rear of the hopper, the sand is sprinkled evenly over the material placed on said platform.

The paper, cloth, or other material to be coated is spread on the platform A, the compound is poured into the trough, and, as said trough is drawn along, the compound is evenly spread over the paper or other material; and, if desired, sand can be sprinkled over the layer of compound.

I have used my apparatus with advantage for making roofing-material or floor-coverings.

What I claim as new, and desire to secure by Letters Patent, is—

1. The arrangement of a trough carrying a scraper adjusted by a screw and fitting on guide-ways on the edges of a platform or table which supports the material to be coated, substantially as described.

2. The movable scraper C hung on gudgeons, as set forth, in combination with the open trough B and platform A, substantially as set forth.

3. The rubber packing on the sides of the trough B, in combination with the platform A, substantially as described.

4. The hopper F provided with apron $h$, combined with the trough B and platform A, substantially in the manner set forth.

W. B. DAVIES.

Witnesses:
W. HAUFF,
E. G. KASTENHUBER.